United States Patent
Glikman et al.

[11] 4,074,994
[45] Feb. 21, 1978

[54] PROCESS AND APPARATUS FOR THE MANUFACTURE OF ORNAMENTAL SHEET GLASS

[76] Inventors: Mark Leonovich Glikman, ploschad Kommunarnaya, 11, kv. 45; Zakhar Isaevich Sapunar, ulitsa Mezhdunarodnaya, 26, kv. 13; Albert Vladimirovich Avrus, ulitsa Zagorodneva, 15, kv. 77; Vladilen Alexandrovich Gorokhovsky, ulitsa Lomonosova, 3, kv. 9; Evgeny Borisovich Fainberg, Oktyabrsky poselok, 8 Linia, 32; Vladimir Alexandrovich Ivanov, ulitsa Zagorodneva, 15, kv. 81; Tatyana Leonidovna Shirkevich, ulitsa Lampovaya, 4, kv. 24; Vadim Mikhailovich Sizov, ulitsa Lomonosova, 11, kv. 4, all of Saratov, U.S.S.R.

[21] Appl. No.: 714,763

[22] Filed: Aug. 16, 1976

[51] Int. Cl.² ............................................... C03B 18/02
[52] U.S. Cl. ...................................... 65/44; 65/65 A; 65/99 A; 65/182 R
[58] Field of Search ............ 65/44, 65 A, 99 A, 182 R

[56] References Cited

U.S. PATENT DOCUMENTS

| | | | |
|---|---|---|---|
| 3,326,653 | 6/1967 | De Lajarte et al. | 65/65 A |
| 3,472,641 | 10/1969 | Gray | 65/182 R |

*Primary Examiner*—Arthur D. Kellogg
*Attorney, Agent, or Firm*—Holman & Stern

[57] ABSTRACT

The process comprises continuously forming a glass strip on surface of molten metal and concurrently treating the glass surface in plastic state with a reactant. The reactant comprises a substance which is capable of forming a surface layer having a viscosity which is substantially greater than the viscosity of the basic glass mass. The distinctive feature of the process consists in that the glass strip treated with the reactant is subjected to deformation so as to form rips which define, in combination, an ornamental pattern of glass. The apparatus according to the invention is characterized in that each conduit has an independent system for reactant supply to the glass surface, and all conduits are arranged in a hollow casing filled with a cooling medium, and driven endless tracks are provided downstream the casing in the direction of glass flow which are in contact with the glass strip.

14 Claims, 2 Drawing Figures

PROCESS AND APPARATUS FOR THE MANUFACTURE OF ORNAMENTAL SHEET GLASS

The invention relates to the manufacture of sheet glass, and more particularly to process and apparatus for the manufacture of ornamental sheet glass.

The invention may be used in the manufacture of constructional and finishing materials, as well as in construction where the ornamental glass according to the invention may be employed in wall structures, for filling door leaves and for decoration of interiors.

Various processes for the manufacture of ornamental sheet glass are known in the art, including those involving the formation of a glass strip in a bath containing melt.

Thus it is known to produce pattern glass by contacting a strip formed in a bath containing melt with a hard-metal tool for applying a pattern. This process enables the manufacture of ornamental glass with a repetitive pattern.

It is also known to apply a pattern to float glass during manufacture by feeding compressed gas jets to the glass surface at different angles. A pattern is imprinted on the glass surface in the form of grooves.

Known in the art are various modifications of the glass surface obtained by acting on hot glass, which is sensitive to surface changes, with various chemical agents in liquid or gaseous state. Thus it is known to obtain ornamental coloured glass by treating a glass strip with melt of a metal colouring the glass at final stages of the strip formation concurrently with application of an electric potential to the metal/glass/metal melt support system. In this process, as a result of penetration of colouring metal ions into the surface layer of the glass strip, the glass is coloured. The colour may be uniform or variable, but in any case the glass exhibits smooth lustrous and polished surface.

It is known to apply a metal coat to glass floating on the surface of melt in a bath by introducing metal vapours in a gas carrier, such as nitrogen or argon and directing the gas stream to the glass. The coat is applied by a method of several successive treatments: first with a metal improving the adhesion (such as with W, Ag, Cr, Al, Ni, Pd-Ni alloy), then with a basic metal (such as Al, Cu, Ag, Sn, or Au) and finally, with protective layer of magnesium fluoride, copper or tin oxide.

It is known to produce glass having coloured and electrically conductive film, e.g. by applying metal compounds in vapour phase under oxidation conditions, the application being controlled in such a manner that oxidation should occur directly in the surface layer of glass without the formation of an independent phase (cf. British patent specification No. 1282886, C 03 b). Metal used for such treatment may comprise a hollow solid rod of glass, and an oxidizing gas (chlorine or oxygen) which is passed through the metal directly adjacent to the glass surface.

Finally, it is known to treat glass articles which contain, in at least a portion of their surface a reducing agent such as tin protoxide, the method involving the step of treating such portion of the glass surface at 450° – 750° C and for a certain time with a compound of a colouring metal in gaseous, dissolved or molten state or in the form of a paste so as to introduce a certain amount of the colouring metal into the glass surface to impart a desired colour thereto (cf. British patent specification No. 1107887, C 03 b). Glass obtained by this method may be of red, yellow, brown or blue colour depending on the kind of pigment used, the colour may be different with respect to penetrating light and reflected light. However, in any case, glass retains lustrous polished surface.

The above-described methods for obtaining ornamental sheet glass have a number of disadvantages. Thus, methods for applying relief pattern involve the mechanical concept of pattern formation by knurling a pattern by means of a hard tool or using compressed gas jets so that either a repetitive pattern may be produced (in case of printing), or a comparatively regular geometrical pattern (in case of gas jets). Such methods offer relatively limited opportunities in respect of aesthetic values of relief patterns obtained.

Methods for modification of glass surface by acting thereon with chemical reactants enable the provision of ornamental effects by colouring the surface, but they cannot provide any relief pattern. When glass is manufactured using these methods, it retains smooth, lustrous and polished surface finish.

Known in the art is an apparatus for treating a glass strip moving in a melt bath for modification of the surface thereof (cf. USSR patent No. 302893, C 03 b 18/20). The apparatus comprises a bath containing a melt and a device for feeding metal vapours and oxidizing gas to the glass strip and for removal of reaction products from the treatment zone. The device is mounted within the bath containing the melt over the glass strip transversally relative to the direction of the strip flow. Metal used for modification of the glass surface is placed in the device in the form of a solid rod or melt. A gas reactant is passed through the rod or melt to transport metal vapours to the glass surface. In addition, an oxidizing gas is fed along a conduit having an opening for feeding the gas to the glass surface. Reaction products are removed from the treatment zone through drain conduits.

This apparatus is deficient in that there is no possibility for controlling the process of glass surface treatment widthwise of the strip, and no provisions are made for deformation of the surface layers of glass to impart ornamental appearance to the glass.

The main object of the invention is to provide a process for the manufacture of a new kind of ornamental sheet glass.

Another object of the invention is to provide a process for the manufacture of ornamental sheet glass using physical and chemical processes occurring during the treatment of a glass strip formed on metal melt with reactants.

A further object of the invention is to provide a process using inexpensive and readily available reactants for the manufacture of ornamental glass.

An additional object of the invention is to provide an apparatus enabling the control of reactant supply to the glass surface and providing for modification of the surface layer of glass to impart an ornamental effect thereto.

These and other objects are accomplished during continuous forming of a glass strip on the surface of molten metal, concurrently with the treatment of the glass surface which is in plastic state, with a reactant. In accordance with the invention, the reactant comprises a substance which is capable of forming a surface layer having a viscosity which is substantially greater than the viscosity of the basic glass mass, and the glass strip treated with the reactant is subjected to deformation in such a manner as to form rips in the resultant surface layer of glass, the combination of rips defining an ornamental pattern of glass.

The above object is also accomplished in an apparatus for effecting the process for the manufacture of ornamental glass comprising a bath containing molten metal and conduits arranged thereover having nozzles for feeding a reactant to the upper surface of the glass strip formed on the surface of molten metal, in accordance with the invention, each conduit has an independent system for feeding the reactant to the glass surface, and all conduits are accommodated in a hollow casing filled with a cooling medium, driven endless tracks being provided downstream the casing in the direction of the glass strip flow which are in contact with the glass strip.

The reactant preferably comprises carbonaceous compounds.

Among carbonaceous compounds, propane and/or butane and/or butylene, as well as products of dry distillation of timber and kerosene are preferably used as reactants.

The glass strip can be deformed by tensioning it in longitudinal or transverse direction. The strip is preferably deformed by tensioning it in both longitudinal and transverse directions.

The strip is preferably repeatedly treated with a reactant.

In order to impart an additional ornamental effect, the glass surface may be coloured after deformation. The glass may also be metallized after deformation of the strip.

In order to improve the efficiency of operation of the apparatus, the conduits having nozzles are arranged within the casing substantially horizontally in parallel with one another and at an angle with respect to the longitudinal axis of the bath.

In order to protect the glass strip against the action of cooling agent, the casing is provided with thermal insulation on the side of the glass strip.

The invention concept consists in the following.

Glass in a viscous-plastic state at 700° – 1050° C is treated with a reactant which is capable of forming a comparatively rigid layer strongly bound to the glass, the viscosity of this layer being substantially greater than the viscosity of internal layers of glass. During further deformation of the strip, this layer is likely to behave as a film with respect to other layers of glass thus exhibiting properties which are different from those of the basic glass mass. As a result, rips are formed in this film upon relatively uniform tensioning of the strip being formed. It should be noted that further deformation of the strip portions occurs in different ways depending on the presence or absence of the film on various portions, and this results in the formation of the strip with non-repetitive pattern. In the finished strip, those portions which were provided, during the forming, with a highly viscous film, exhibit a substantially mat, light-diffusing finish, and the rip portions have a lustrous, corrugated surface.

The glass strip is preferably treated with gaseous reactants which are decomposed at high temperature to form, on the glass surface, a highly viscous layer intimately bound to the glass surface during the forming. Thus, if a glass strip which is formed in a melt bath with an atmosphere practically free of oxygen is treated with carbonaceous compounds, such compounds are decomposed at high temperature to form a comparatively rigid highly viscous layer which essentially consists of carbon, on the glass surface. During further deformation of the glass strip this layer is ripped together with other glass layers adjacent thereto. As examples of carbonaceous organic compounds which may be used for treating the glass strip in the melt bath the reference may be made to products of dry distillation of timber, propane, butane, butylene, kerosene. These reactants may be used both separately and in various combinations.

The strip may be also treated with solid reactants which evaporate in the bath conditions and then are condensed on the strip surface in the form of a highly viscous layer which performs as described above. Zinc and aluminium powders were found to be such reactants, and they resulted in an effect which looked like that obtained when using carbonaceous compounds. After the formation of the above-described surface layer, the glass strip is subjected to deformation to form rips in this layer. Where the strip is subjected to the longitudinal tensioning, the resultant rips are oriented substantially in the transverse direction. Where the strip is tensioned in the transverse direction, the resultant rips extend substantially lengthwise. In case the strip is tensioned in both longitudinal and transverse directions, the combination of rips acquires the form of fancifully distributed sinuous differently directed lines.

The pattern control may also be obtained by repeated treatment. For that purpose, the bath should be provided with two or several arrangements for feeding reactants to the glass surface. After the strip has passed under the first arrangement, a layer is formed on the strip surface to be ripped upon deformation of the strip. When the strip passes under the second arrangement, a layer is again formed on the portions of the rips remaining after the first treatment, and the new layer forms a new system of rips upon further deformation, the new system being superposed on the old one. After two or several treatments, the strip acquires a pattern which is different from that obtained after the first treatment.

After the deformation, the glass surface may be coloured. Depending on the method used, either the entire surface or individual portions thereof may be coloured. Thus, after the treatment of the glass strip surface with carbonaceous compounds, the glass surface may be coloured with metal melt by the electrochemical method at the final stages of strip formation in the bath. By this method, lustrous portions of the glass surface at the rip points may be coloured without influencing the mat portions of the surface.

An additional effect may be obtained by metallization of the glass surface after the treatment with the reactant and upon deformation of the strip. Metallization of the surface may be effected both in and outside the melt bath. Thus, after the cooling of the glass strip, the surface thereof treated by the above-described method may be coated with aluminium layer and protective layer of lacquer similarly to the methods used in the mirror production. The relief character of glass surface is thereby pronounced, and artistic quality of the resultant pattern is improved.

The above operations define a highly productive process for the manufacture of ornamental sheet glass having non-repetitive ornamental pattern.

The invention will be better understood from the following description of a specific embodiment of an apparatus for effecting the process according to the invention with reference to the accompanying drawings, in which.

Figure 1:
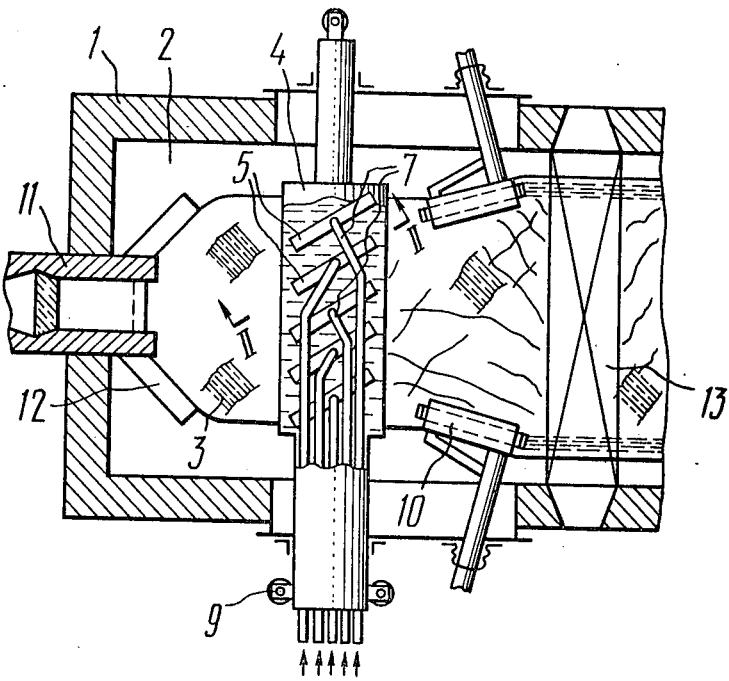
FIG. 1 is a diagrammatic plan view of the apparatus for the manufacture of ornamental sheet glass.
Figure 2:
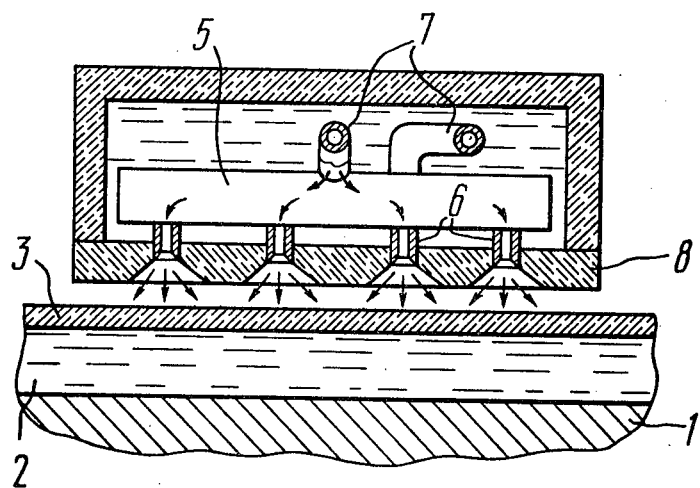
FIG. 2 is a sectional view taken along the line II—II in FIG. 1.

The apparatus (FIG. 1) comprises a bath 1 containing molten metal 2 and an arrangement for feeding a reactant to the upper surface of a glass strip 3 formed on the surface of the metal melt. The arrangement is disposed over the strip 3 transversally thereof and may comprise a hollow casing 4 made of a steel sheet and filled with a cooling medium. The cooling medium is water. The casing 4 accommodates conduits 5 having nozzles 6 which pass through the bottom wall of the casing 4. Each conduit 5 has an independent reactant supply system which includes a supply pipe 7 having a control valve and a rotary flow meter indicating the flow rate of the reactant, (both devices are not shown).

The conduits 5 are arranged within the casing 4 substantially horizontally in parallel with one another and at an angle with respect to the longitudinal axis of the bath 1.

In order to prevent the pyrolysis of reactant which may start in the nozzles 6, and to protect the surface of the glass strip 3 in the treatment zone against overcooling, the bottom wall of the casing 4 is provided with thermal insulation 8. The arrangement is provided with screw supports 9 for adjusting the vertical position of the arrangement relative to the metal bath 1 containing molten metal 2. Driven endless tracks 10 are provided downstream from the casing 4 in the direction of flow of the glass strip 3 which are in contact with the strip 3 to deform the latter. The tracks 10 are mounted on either side of the strip for applying uniform deforming forces.

The above-described apparatus functions in the following manner.

Liquid glass is fed from a furnace along a trough 11 to the bath 1 containing molten metal 2. On either side of the bath 1, along the trough 11, there are provided lateral boards 12 limiting the stream of glass mass. The stream of glass mass spreads over the molten metal to form the glass strip 3 which flows under the casing 4 to be treated with a reactant which is fed through the conduits 5 and nozzles 6 to the upper surface of the glass strip 3. Independent systems of reactant supply to each conduit enable the controlled treatment of the glass strip over the entire width thereof. The treatment of the glass strip with the reactant results in the formation, on the surface thereof, of a layer having a viscosity which is greater then the viscosity of the basic glass mass. As the glass strip continues its movement, it enters the zone of action of the driven endless tracks 10 to be subjected to deformation. The amount of longitudinal and transverse forces depends on the ratio of the track speeds and flow velocity of the glass strip, as well as on the angle of installation of the tracks 10.

In order to apply uniform forces, the tracks 10 are mounted on either side of the glass strip 3. Rips are formed in the glass strip 3, and the combination of rips defines an ornamental pattern of glass. Then the glass strip 3 enters the zone of influence of a cooling arrangement 13 to be cooled and then removed from the bath 1 by any appropriate method.

The invention enables the production of a new kind of ornamental glass with a non-repetitive relief pattern.

Specific embodiments of the process according to the invention are given herebelow.

EXAMPLE 1

A glass strip was treated during the formation in a bath with molten metal in a protective atmosphere practically free of oxygen at 1000° C with propane and then deformed substantially in the longitudinal direction. As a result, glass having a non-repetitive ornamental pattern was obtained.

EXAMPLE 2

A glass strip was treated during the formation in a bath with molten metal in a protective atmosphere practically free of oxygen at 940° C with a mixture of propane and butane and then deformed substantially in the longitudinal direction. As a result, glass having a non-repetitive ornamental pattern was obtained.

EXAMPLE 3

As glass strip was treated during the formation in a bath with molten metal in a protective atmosphere practically free of oxygen at 1000° C with products of dry distillatin of wood and then deformed in longitudinal and transverse direction. As a result, glass having a non-repetitive ornamental pattern was obtained.

EXAMPLE 4

A glass strip was treated during the formation in a bath containing molten metal in a protective atmosphere practically free of oxygen at 900° C with a mixture of butane and butylene and then deformed in the longitudinal and transverse directions. As a result, glass having a non-repetitive ornamental pattern was obtained.

EXAMPLE 5

A glass strip was treated during the formation in a bath containing molten metal in a protective atmosphere practically free of oxygen at 800° C with kerosene vapours and then deformed substantially in the longitudinal direction. As a result, glass having a non-repetitive ornamental pattern was obtained.

EXAMPLE 6

A glass strip was treated during the formation in a bath containing molten metal in a protective atmosphere practically free of oxygen at 1000° C with aluminium powder and then deformed in the longitudinal and transverse directions. As a result, glass having a non-repetitive ornamental pattern was obtained.

EXAMPLE 7

A glass strip was treated during the formation in a bath containing molten metal in a protective atmosphere substantially free of oxygen at 1000° C with a mixture of propane and butane and then deformed substantially in the transverse direction; then the strip was treated at 900° C with a mixture of butane and butylene with subsequent deformation substantially in the longitudinal direction. As a result, glass having a non-repetitive ornamental pattern was obtained.

The ornamental glass obtained in accordance with the invention had a fancy relief pattern defined by randomly alternating glass portions of fancy shapes having both mat and lustrous finish. The glass is of limited transparency and its light transmission is about equal to that for polished glass. New ornamental effect might be pronounced by using complete or partial colouring or metallization of the glass surface after treatment with reactants and deformation.

What is claimed is:

1. A process for the manufacture of ornamental sheet glass comprising continuously forming a glass strip on the surface of molten metal, concurrently treating the glass surface in plastic state with a reactant comprising a substance which is capable of forming a surface layer having a viscosity which is substantially greater than the viscosity of the basic glass mass in a quantity sufficient to form such a more viscous surface layer and immediately deforming the glass strip treated with said reactant in such a manner as to form rips in the resultant surface layer of the glass, the combination of rips defining an ornamental pattern of glass.

2. A process according to claim 1, wherein the reactant comprises carbonaceous compounds.

3. A process according to claim 2, wherein the reactant comprises a substance selected from the group consisting of propane, butane and butylene.

4. A process according to claim 2, wherein the reactant comprises products of dry distillation of timber.

5. A process according to claim 2, wherein the reactant comprises kerosene.

6. A process according to claim 1, wherein the glass strip is deformed by tensioning it in the longitudinal direction.

7. A process according to claim 1, wherein the glass strip is deformed by tensioning it in the transverse direction.

8. A process according to claim 1, wherein the glass strip is deformed by tensioning it in the longitudinal and transverse directions.

9. A process according to claim 1, wherein the glass strip is repeatedly treated with a reactant.

10. A process according to claim 1, wherein the glass surface is coloured after the strip deformation.

11. A process according to claim 1, wherein the glass surface is metallized after the strip deformation.

12. An apparatus for the manufacture of ornamental sheet glass comprising: a bath containing molten metal; elongated conduits having nozzles arranged in an overlapping pattern over said bath for feeding a reactant to the upper surface of a glass strip which is formed on the surface of molten metal, said reactant comprising a substance which is capable of forming a surface layer having a viscosity which is substantially greater than the viscosity of said glass strip; a system for feeding the reactant to said conduits provided for each of said conduits; a hollow casing filled with a cooling medium, said casing accommodating all said conduits leading to said conduits; driven endless tracks provided downstream of said casing in the direction of flow of said glass strip in contact with said strip, and means for moving said tracks at a different speed than said glass strip thus deforming the same to produce rips in the upper surface layer.

13. An apparatus according to claim 12, wherein the conduits having nozzles are arranged within the casing substantially horizontally in parallel with one another and at an angle with respect to the longitudinal axis of the bath.

14. An apparatus according to claim 12, wherein the casing is provided with thermal insulation on the side of the glass strip.

* * * * *